United States Patent
Aalderink (10) Patent No.: US 8,960,694 B2
(45) Date of Patent: Feb. 24, 2015

(54) TRAILING ARM MOUNTING BRACKET

(75) Inventor: Derk Geert Aalderink, Laren (NL)

(73) Assignee: VDL Weweler B.V., Apeldoorn (NL)

( * ) Notice: Subject to any disclaimer, the term of this patent is extended or adjusted under 35 U.S.C. 154(b) by 90 days.

(21) Appl. No.: 13/634,383

(22) PCT Filed: Mar. 25, 2010

(86) PCT No.: PCT/NL2010/000057
§ 371 (c)(1),
(2), (4) Date: Sep. 12, 2012

(87) PCT Pub. No.: WO2011/119020
PCT Pub. Date: Sep. 29, 2011

(65) Prior Publication Data
US 2013/0001913 A1 Jan. 3, 2013

(51) Int. Cl.
*B60G 7/02* (2006.01)
*B60G 9/00* (2006.01)
(Continued)

(52) U.S. Cl.
CPC *B60G 9/003* (2013.01); *B60G 7/02* (2013.01); *B60G 11/27* (2013.01); *B62D 21/11* (2013.01); *B60G 2200/31* (2013.01); *B60G 2202/152* (2013.01); *B60G 2202/24* (2013.01);
(Continued)

(58) Field of Classification Search
CPC .......... B60G 7/001; B60G 7/02; B60G 7/008; B60G 9/003; B60G 2200/31; B60G 2204/143; B60G 2204/41; B60G 2204/4302; B60G 2206/017; B60G 2206/10; B60G 2206/601; B60G 2206/722

USPC .......... 280/124.116, 124.128, 149.2, 124.109
See application file for complete search history.

(56) References Cited

U.S. PATENT DOCUMENTS 3,844,579 A * 10/1974 Cunha .......... 280/86.75
4,310,171 A * 1/1982 Merkle .......... 280/86.75
(Continued)

FOREIGN PATENT DOCUMENTS

DE 102006009872 A1 9/2007
EP 0325002 A1 7/1989
(Continued)

OTHER PUBLICATIONS

English Machine Translation of DE 102006009872.
(Continued)

*Primary Examiner* — James English
(74) *Attorney, Agent, or Firm* — Hoffmann & Baron, LLP; John S. Sopko (57) ABSTRACT

A trailing arm mounting bracket for mounting a trailing arm to a chassis or slider assembly of a vehicle, preferably a commercial vehicle, for example a lorry or a lorry trailer, includes two side plates each having a top end, a bottom end, and an opening in the bottom end for receiving a hinge pin, which side plates are positioned opposite each other with their opening at a mutual distance for receiving an end of the trailing arm in between their respective bottom ends, the side plates being mounted with their respective top ends to an in a mounted condition vertically oriented mounting plate, which mounting plate is arranged to connect the mounting bracket to the chassis or slider assembly, and where a center of the shortest distance between the two openings in the side plates lies substantially in a plane defined by the body of the mounting plate.

19 Claims, 5 Drawing Sheets (51) Int. Cl.
*B60G 11/27* (2006.01)
*B62D 21/11* (2006.01)

(52) U.S. Cl.
CPC ..... *B60G2204/128* (2013.01); *B60G 2204/129* (2013.01); *B60G 2204/143* (2013.01); *B60G 2204/148* (2013.01); *B60G 2204/4302* (2013.01); *B60G 2206/60* (2013.01); *B60G 2206/601* (2013.01); *B60G 2206/722* (2013.01); *B60G 2300/02* (2013.01); *B60G 2300/024* (2013.01); *B60G 2300/026* (2013.01); *B60G 2300/04* (2013.01); *B60G 2300/042* (2013.01)
USPC .......................... 280/124.109; 280/124.128

(56) References Cited

U.S. PATENT DOCUMENTS

| | | | |
|---|---|---|---|
| 5,088,763 | A | 2/1992 | Galazin et al. |
| 6,439,588 | B1* | 8/2002 | Svensson ............... 280/124.116 |
| 7,178,817 | B1 | 2/2007 | Welles et al. |
| 2001/0052685 | A1 | 12/2001 | Svartz et al. |
| 2003/0047906 | A1 | 3/2003 | Hicks et al. |
| 2007/0158924 | A1* | 7/2007 | Peaker et al. .......... 280/124.116 |
| 2008/0036167 | A1* | 2/2008 | Svartz et al. ........... 280/124.116 |
| 2008/0252032 | A1* | 10/2008 | Keeler ................... 280/124.116 |
| 2009/0212522 | A1* | 8/2009 | Stuart et al. ............ 280/124.109 |

FOREIGN PATENT DOCUMENTS

| | | |
|---|---|---|
| EP | 0615869 A2 | 9/1994 |
| EP | 1284208 A2 | 2/2003 |
| EP | 1459914 A1 | 9/2004 |
| EP | 1481824 A1 | 12/2004 |
| EP | 1777085 A2 | 4/2007 |
| EP | 1970225 A1 | 9/2008 |
| EP | 2106934 A1 | 10/2009 |
| FR | 2737443 A1 | 2/1997 |
| JP | 2002301990 | 10/2002 |
| JP | 2002308143 | 10/2002 |
| WO | WO 2009-077810 A1 | 6/2009 |

OTHER PUBLICATIONS

English Machine Translation of EP 0615869.
English Machine Translation of EP 1777085.
English Machine Translation of FR 2737443.
English Abstract Translation of JP 2002-301990.
English Abstract Translation of JP 2002-308143.

* cited by examiner

TRAILING ARM MOUNTING BRACKET

CROSS-REFERENCE TO RELATED APPLICATIONS

This application is the National Stage of International Application No. PCT/NL2010/000057, filed Mar. 25, 2010, the contents of which is incorporated by reference herein.

FIELD OF THE INVENTION

The invention relates to the field of wheel axle suspensions. More in particular, the invention relates to a trailing arm mounting bracket for mounting a trailing arm to a chassis of a vehicle, preferably a commercial vehicle, for example a lorry or a lorry trailer.

The trailing arm, also called suspension arm, supports the wheel axle and is hingeably connected at its front end, seen in the direction of travel of the vehicle, to the mounting bracket.

The invention furthermore relates to a wheel axle suspension comprising such a mounting bracket, to a trailer slider assembly provided with such a wheel axle suspension, and to a vehicle provided with such a trailer slider assembly and/or wheel axle suspension.

BACKGROUND OF THE INVENTION

A mounting bracket of the mentioned type is known in the art and typically comprises two sidewall portions each having a top end and a bottom end, which sidewall portions are positioned opposite each other at a mutual distance for receiving an end of the trailing arm in between their respective bottom ends.

As the trailing arm supports the wheel axle, relatively large forces need to be transmitted to the chassis via the mounting bracket. Usually transmittal of said forces is done by mounting the mounting bracket directly below a chassis element, as is for instance done in EP 1459914 and EP 1481824 in which the mounting bracket is mounted to a lower flange of an I-beam of the chassis.

However, the mounting bracket may have to be mounted to other types of beams, such as U-, L- or Z-beams, especially in case of a trailer slider assembly. A trailer slider assembly allows a wheel axle including wheel axle suspension to be moved relative to the chassis in a longitudinal direction of the vehicle in order to change the position of the wheels, e.g. in order to change the wheel base of the vehicle, which may be advantageous from load point of view. The trailer slider assembly usually comprises a slider frame which slidingly engages with the chassis and a fixing mechanism to fix the slider frame relative to the chassis in a predetermined position. The wheel axle suspension and the wheel axle are in turn mounted to the slider frame.

Mounting the mounting bracket in alternative ways to, e.g. other types of, beams may not result in an efficient transmittal of forces to the chassis as force moments may be introduced. This problem is currently solved by using reinforcement elements allowing the proper transmittal of forces to the chassis. However, the reinforcement elements add weight to the vehicle and introduce extra assembly steps.

It is therefore an object of the invention to provide an improved trailing arm mounting bracket, in particular a trailing arm mounting bracket that minimizes the amount of force moments applied to the chassis or slider assembly in use and/or reduces the assembly steps.

SUMMARY OF THE INVENTION

This object is achieved by means of a trailing arm mounting bracket for mounting a trailing arm to a chassis or slider assembly of a vehicle, wherein the bracket comprises two side plates each having a top end, a bottom end, and an opening in the bottom end for receiving a hinge pin, which side plates are positioned opposite each other with their opening at a mutual distance for receiving an end of the trailing arm in between their respective bottom ends, said mounting bracket furthermore comprising a mounting plate comprising a plate body, wherein said side plates are mounted with their respective top ends to the, in a mounted condition, essentially vertically oriented mounting plate, which mounting plate is arranged to connect the mounting bracket to the chassis or slider assembly, and wherein a centre of the shortest distance between the two openings in the side plates lies substantially in a plane defined by the body of the mounting plate.

By providing a vertically oriented mounting plate to which the side plates are mounted, the mounting bracket can easily be mounted to corresponding vertical portions of the chassis or slider assembly, thereby transmitting forces directly to the chassis or slider assembly without using any additional elements. As the centre of the shortest distance between the two openings in the side plates lies substantially in a plane defined by the body of the mounting plate, the force moments applied by the trailing arms to the mounting brackets will be minimal, and preferably also the force moments applied to the chassis and/or the sliding assembly through the mounting plate will be minimal. Therefore no additional reinforcement elements to withstand these force moments are required, resulting in less assembly steps. The mounting bracket therefore provides a light-weight solution for different types of beams used in chassis or slider assemblies.

Another advantage may be that the side plates which engage with the trailing arm may be specially designed for the trailing arm, whereas the mounting plate can be designed as a universal component. Adjustment of the mounted bracket can thus easily take place by replacing the mounting plate only. As the mounting plate is an easy to manufacture component, the costs and investments of this adjustment are low.

Further, the side plates may easily be replaced to adjust the mounting bracket to another type of trailing arm and they can be attached to the chassis or slider assembly via the same mounting plate in a similar universal manner. This increases the design freedom of the mounting bracket as only a relatively small part of the mounting bracket needs to be replaced and/or specially designed for the trailing arm.

In an embodiment, the mounting plate is located in between the top ends of the respective side plates, preferably the side plates are symmetrically formed about said plane defined by the body of the mounting plate. Seen in the direction of travel of the vehicle, the cross section of the mounting bracket will therefore substantially have the shape of a two-pronged fork, wherein the mounting plate forms the "handle" of the fork and the two side plates form the two "prongs". Preferably, the mounting bracket is also symmetrical about a vertical plane in a transverse direction of the vehicle. This makes manufacturing easier, as both side plates are similar to each other. Further, it may result in a simpler assembly as well, because each side plate can be placed on the inside or the outside of the trailing arm seen in transverse direction of the vehicle, and interchanging them has no effect on the construction.

In another embodiment, the side plates are mounted to the mounting plate by means of side plate mounting bolts. This makes the assembly simpler as no welding is required, and allows the mounting plate or side plates to be replaced easily in case an adjustment is required.

The mounting plate preferably comprises holes to receive the respective side plate mounting bolts. These holes may have the form of slots to allow adjustment of the relative position between side plates and mounting plate. Similar holes may be provided to the top end of the mounting plate or to the chassis or slider assembly to allow adjustment of the relative position between the mounting plate and the chassis or slider assembly.

In another embodiment, the bottom ends of the side plates are substantially parallel, wherein inwardly projecting dents are provided in the bottom ends in a region around the opening. In this way, the mounting bracket is able to cooperate with an attachment eye of the trailing arm which preferably has corresponding dents that match with the dents of the side plates. In this way, the mounting bracket is able to support the trailing arm in all directions, and the attachment eye can be made by forging. Preferably, the dents in the side plates have a tapering sidewall.

Tapering means that the sidewall or any other component referred to as being tapering has a first end and a second end, wherein a diameter at the first end is larger than a diameter at the second end, and wherein the diameter is continuously decreasing from the first end to the second end. This tapering shape could be a conical shape, but could also be a spherical shape.

From strength point of view, the mounting plate does not necessarily have to be a solid plate. Therefore, besides from possible mounting holes to mount the mounting plate to the chassis or slider assembly or the side plates to the mounting plate, at least one weight-saving cutout may be provided in the mounting plate which does not significantly reduce the strength in the longitudinal direction of the mounting plate, but does reduce the weight of the mounting plate.

The invention also relates to a wheel axle suspension according to claim 8 provided with a mounting bracket according to the invention as described above and with reference to embodiments in the drawings below.

In an embodiment, the hinge pin extends through an attachment eye of the longitudinal trailing arm, wherein the attachment eye comprises a central bore portion and two opposing tapering bore portions, wherein the central bore portion connects the inner ends of the opposing tapering bore portions, and wherein further two resilient rings and two clamping members are provided, each having a central bore for the hinge pin, wherein, in the mounted state, the resilient ring is received at least partially within a respective tapering bore portion, said resilient ring bearing with one side against the tapering surface of said tapering bore portion and said clamping member is forced against the other side of the resilient ring whereby the resilient ring is compressed between the clamping member and the tapering surface of the tapering bore portion.

Compressed between the clamping member and the tapering surface of the tapering bore portion does not exclude other parts from being present between the clamping members and the resilient ring. It is thus apparent that the clamping member may engage with the resilient ring directly, but that also other parts may be positioned between the clamping member and the resilient ring, e.g. a side plate.

In an embodiment, the resilient ring comprises an elastomeric material, preferably rubber, provided on a metal ring, wherein said metal ring is positioned on the attachment eye side of the elastomeric material or on the clamping member side of the elastomeric material.

In another embodiment, the resilient ring comprises an elastomeric material, preferably rubber, sandwiched between two metal rings.

The one or more metal rings and the elastomeric material are preferably arranged parallel to the tapering bore portions of the attachment eye or a corresponding tapering surface of the clamping member.

An advantage of the metal rings is that the metal rings engage with the clamping member or side plate and/or attachment eye instead of the elastomeric material and allow slip/stick-slip between the resilient ring and the clamping member or side plate and/or attachment eye when the attachment eye of the trailing arm moves over a relatively large angle with respect to the mounting bracket. This reduces the chances of damaging the elastomeric material due to heavy loads and movements.

In an embodiment, the mounting bracket comprises inwardly projecting dents in a region around the openings and the clamping members are provided on the outside of the dents, so that the resilient ring is compressed between the side plate and the tapering surface of the tapering bore portion. Alternatively, the dents in the side plates may be omitted and the clamping members may be located on the inside of the side plates.

In an embodiment, the hinge pin is integrally formed with at least one clamping member. This reduces the number of components required and simplifies the assembly.

In an embodiment, the hinge pin is a hinge bolt cooperating with a nut. Preferably, a clamping member is integrally formed with the hinge bolt, and another clamping member may be integrally formed with the nut.

In another embodiment, the nut comprises a mounting flange for mounting one end of a strut element to the mounting bracket. This strut element may be provided between two hinge pins relating to the same wheel axle or between the hinge pin and the chassis to provide for additional stiffness in the transverse direction of the vehicle.

In an embodiment, a shock absorber is provided between the wheel axle and the mounting plate, or between the wheel axle and the chassis or slider assembly.

In another embodiment, the inwardly located side plate (seen in transverse direction) of the mounting bracket comprises a mounting flange for mounting one end of a strut element to the mounting bracket. The strut element may be provided between opposing side plates of different mounting brackets relating to the same wheel axle or between the side plate and the chassis to provide for additional stiffness in the transverse direction of the vehicle.

The invention also relates to a trailer slider assembly comprising:
  a slider frame to slidingly engage with a chassis of a vehicle in a longitudinal direction of the vehicle;
  a wheel axle extending in use in a transverse direction of the vehicle;
  a wheel axle suspension which is mounted to the slider frame, said wheel axle suspension comprising:
    two trailing arm mounting brackets, each adapted to mount a trailing arm to the chassis or slider assembly of the vehicle, wherein a mounting bracket is provided on each side of the vehicle, said mounting bracket comprising two side plates each having a top end, a bottom end, and an opening in the bottom end adapted to receive a hinge pin, which side plates are positioned opposite each other with their opening at a mutual distance for receiving an end of the trailing arm in between their respective bottom ends, said mounting bracket furthermore comprising a mounting plate comprising a plate body, wherein said side plates are mounted with their respective top ends to the, in a mounted condition, essentially vertically oriented mounting plate, which mounting plate is arranged to connect the mounting bracket to the chassis or slider assembly, and wherein a centre of the shortest distance between the two openings in the side plates lies substantially in a plane defined by the body of the mounting plate longitudinal trailing arms on each side of the vehicle which extend in longitudinal direction of the vehicle and are each hingedly connected to a respective one of said mounting brackets by means of the respective hinge pins; and spring bellows each of which is attached to the other end of the respective longitudinal trailing arms, wherein the mounting brackets and the spring bellows are connected to the slider assembly.

The invention further relates to a trailer slider assembly comprising:

a slider frame to slidingly engage with a chassis of a vehicle in a longitudinal direction of the vehicle;

a wheel axle extending in use in a transverse direction of the vehicle;

a wheel axle suspension comprising:

two mounting brackets on each side of the slider frame which are mounted to the slider frame.

longitudinal trailing arms on each side of the slider frame which in use extend in longitudinal direction of the vehicle and are each hingedly connected at one end to a respective one of said mounting brackets by means of respective hinge pins; and spring bellows each of which is attached to another end of the respective longitudinal trailing arms and are connected to the slider frame, wherein the mounting bracket comprises a mounting plate mounted to the slider frame which mounting plate has an opening to receive the hinge pin, wherein the trailing arm is located on the inner side of the mounting plate, wherein a mounting flange is attached to the hinge pin, and wherein the suspension comprises a strut element interconnecting said mounting flanges located on each side of the slider frame.

In an embodiment, a fixing mechanism is provided to fix the slider frame relative to the chassis of the vehicle, said fixing mechanism comprising operation means to fix and release the fixing mechanism. Said fixing mechanism may for instance be a pin-hole assembly or a clamping structure.

The invention further relates to a vehicle, preferably a commercial vehicle, for example a lorry or a lorry trailer, comprising a mounting bracket and/or wheel axle suspension and/or a trailer slider assembly according to the invention.

The invention also relates to the use of respectively, the mounting bracket, wheel axle suspension, trailer slider assembly, and the vehicle according to the invention.

The invention will now be described in more detail in a non-limiting way by reference to the accompanying drawings in which like reference numerals relate to like parts.

DETAILED DESCRIPTION OF THE INVENTION

Figure 1:
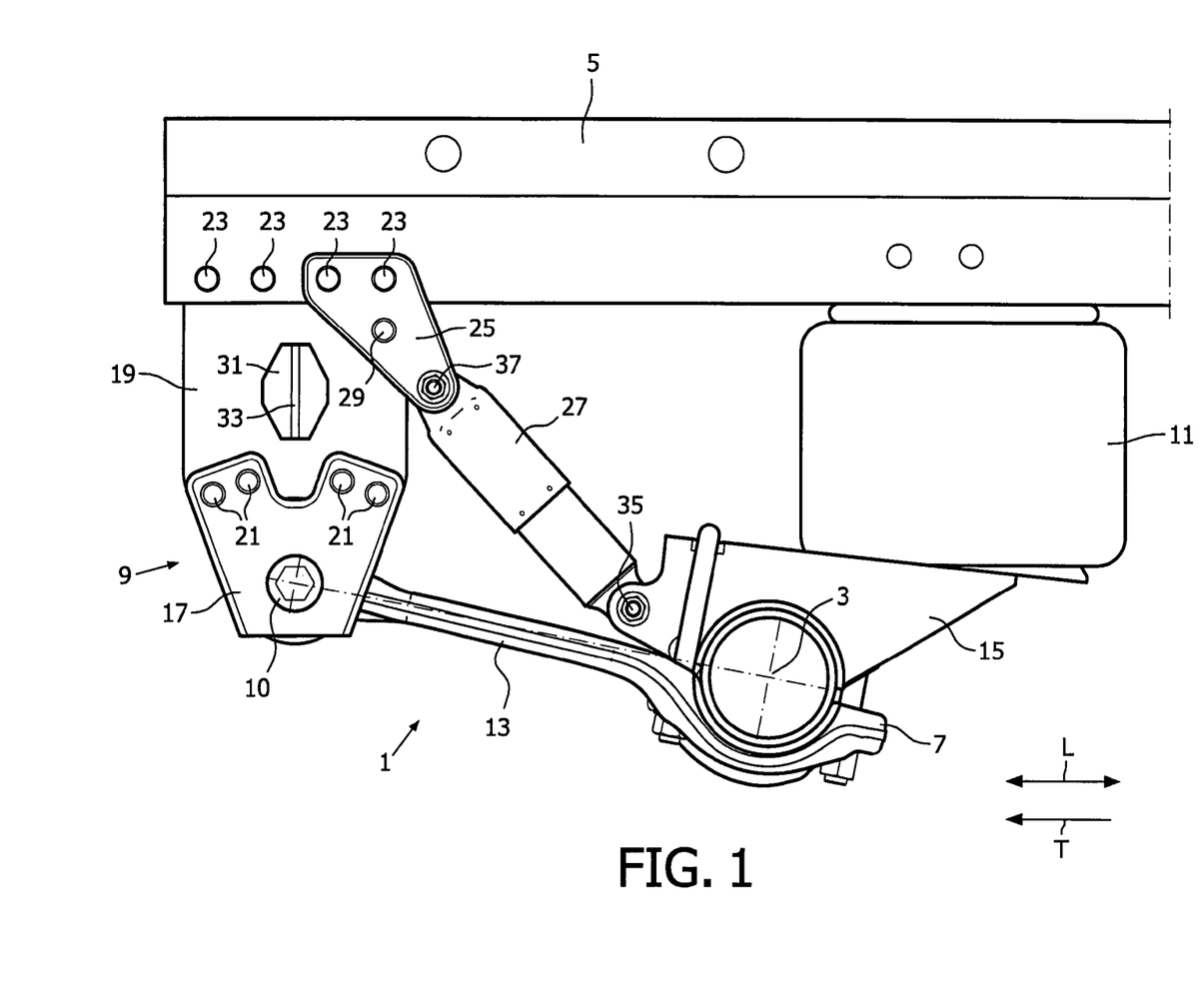
FIG. 1 depicts a wheel axle suspension according to an embodiment of the invention in side view.

FIG. 1 depicts a wheel axle suspension 1 according to an embodiment of the invention. The wheel axle suspension 1 is provided between a wheel axle 3 and a chassis 5 of a vehicle. The wheel axle 3 extends in a transverse direction of the vehicle compared to a longitudinal direction L of the vehicle. The wheel axle is mounted to a longitudinal trailing arm 7 extending in the longitudinal direction of the vehicle. The trailing arm 7 is on one end, i.e. its front end seen in the travelling direction T, hingedly connected to a mounting bracket 9 using a hinge pin 10. The other end of the trailing arm is connected to a spring bellow 11 that is connected to the chassis 5.

In this embodiment, the trailing arm 7 comprises a resilient part 13 and a clamping part 15. Alternatively, the trailing arm can also be a rigid trailing arm. The wheel axle 3 is clamped between the resilient part 13 and the clamping part 15 and thereby connected to the trailing arm 7. The resilient part 13 is able to absorb the forces and movements of the wheel axle relative to the chassis and transmits forces to the chassis via the mounting bracket 9 and the spring bellow 11. It is clear to a person skilled in the art of wheel axle suspensions that the spring bellow can be replaced by any other suitable spring element.

Figure 2:
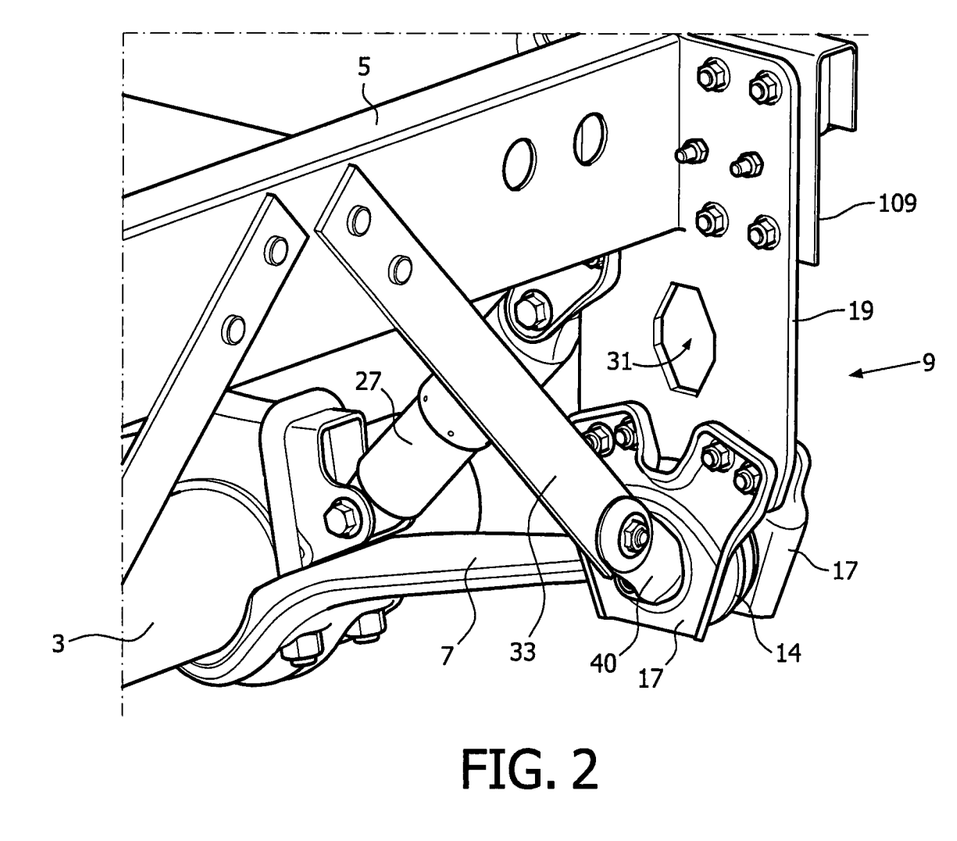
FIG. 2 depicts the wheel axle suspension of FIG. 1 in perspective view.

The mounting bracket comprises two side plates 17 in between which the trailing arm 7 is received. Only one side plate 17 can be seen in this side view. Both side plates 17 are bolted to a mounting plate 19 via essentially horizontal oriented side plate mounting bolts 21. The mounting plate 19 in turn is mounted to the chassis via essentially horizontally oriented mounting plate mounting bolts 23. The mounting plate 19 lies with an upper portion flat against a vertical portion of a chassis beam or a beam of the slider assembly and is clamped thereto by means of the bolts 23. As can be seen in FIG. 2 the beam 109 to which the mounting plate 19 is bolted has no lower flange, contrary to commonly known chassis beams or slider beams, which are often U-shaped. Such a reinforcement by means of a lower flange is not necessary in the structure of the present invention, because force moments on the beam 109 are minimized by bolting the plate 19 flat against the beam 109.

In the specific embodiment shown in FIG. 1 two of the mounting plate mounting bolts 23 are also used to mount a mounting bracket 25 for a shock absorber 27 to the chassis. The mounting bracket 25 is in this case also mounted to the mounting plate directly via bolt 29.

The shock absorber 27 is provided between the chassis and the wheel axle by hingedly connecting one end of the shock absorber to the trailing arm 7 and the other end of the shock absorber to the mounting bracket 25 using respectively hinge pins 35 and 37.

In FIG. 1 it is further shown that the mounting plate 19 is provided with a weight-saving cutout 31 through which a strut element 33 can be seen that provides for stiffness of the wheel axle suspension in the transverse direction, see also FIG. 2.

In FIG. 1 it can also be seen that the trailing arm 7 is received between bottom ends of the side plates 17, and that the side plates are mounted with their respective top ends to the mounting plate 19.

FIG. 2 depicts the wheel axle suspension of FIG. 1 in perspective view. Shown are the mounting bracket 9 with side plates 17 and mounting plate 19 which support an attachment eye 14 of the trailing arm 7 from the chassis 5. Also shown are the axle 3 which is suspended by the wheel axle suspension and the shock absorber 27.

As can be clearly seen in FIG. 2, the side plates 17 are located at opposite sides of the mounting plate 19.

Attached to the hinge pin is a mounting flange 40 to which one end of the strut element 33 is mounted. The other end of the strut element is mounted to the chassis 5 and thereby provides for stiffness in the transverse direction, i.e. parallel to the axle 3.

Figure 3:
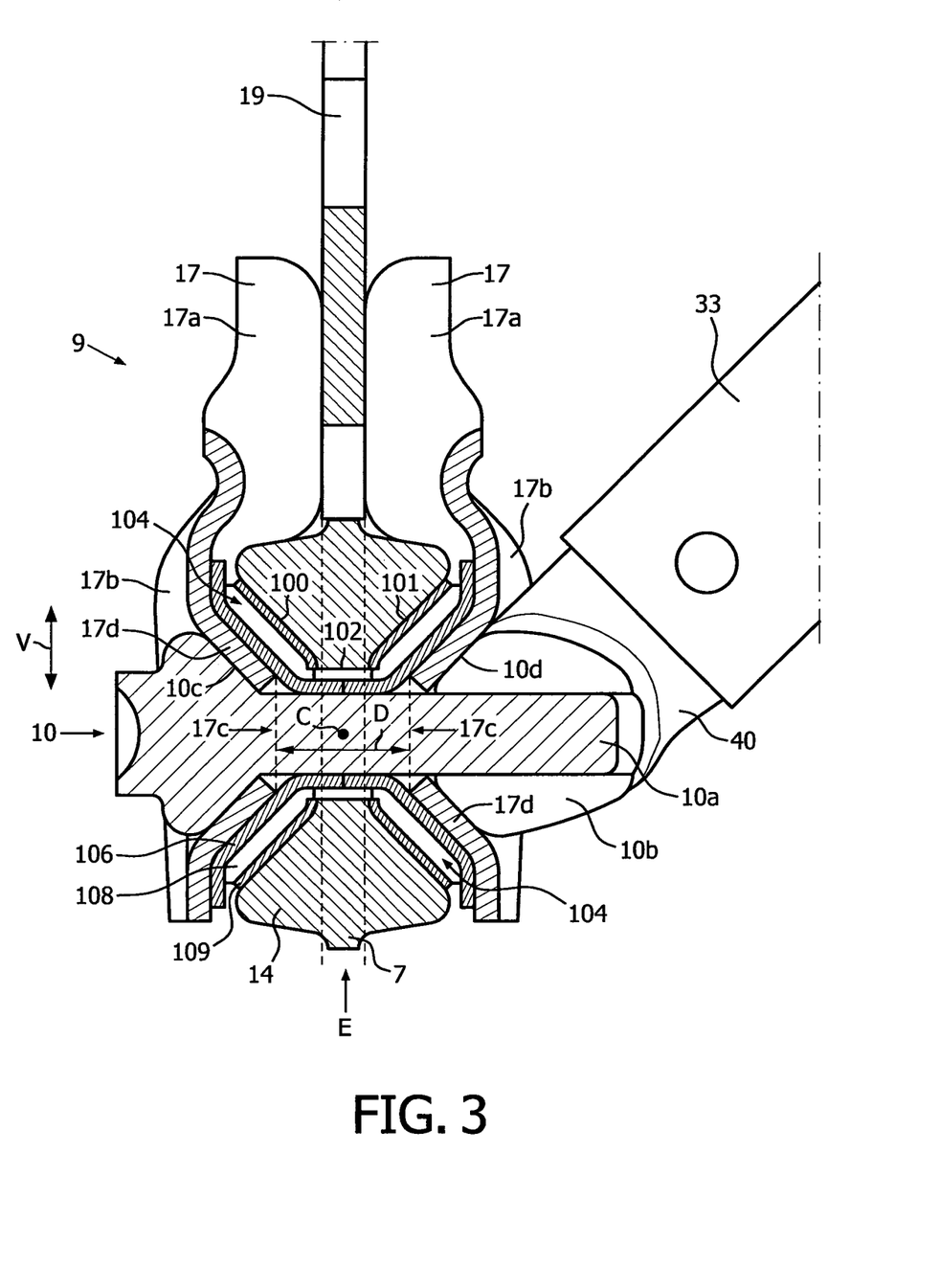
FIG. 3 depicts in cross sectional view the connection between a trailing arm to a mounting bracket according to another embodiment of the invention.

FIG. 3 depicts in cross sectional view the connection of a trailing arm 7 to a mounting bracket 9 according to another embodiment of the invention. The mounting bracket 9 comprises two side plates 17 connected with their top ends 17a to a mounting plate 19 which is connectable to a chassis or a slider assembly. The side plates 17 also comprise a respective opening 17c for receiving a hinge pin 10. The side plates 17 are positioned opposite each other with their opening at a mutual distance for receiving an end 14 of the trailing arm, alternatively referred to as attachment eye, in between their respective bottom ends 17b.

A centre C of the shortest distance D between the two openings 17c in the side plates 17 lies substantially in a plane E indicated by dashed lines and defined by the body of the mounting plate 19. Further, the shape of one side plate 17 is symmetrical to the shape of the other side plate 17 about the plane E. In fact, the mounting bracket 19 with mounting plate 19 and side plates 17 is symmetrical about the plane E. Further, the shape of a side plate 17 may be symmetrical about a vertical plane perpendicular to the plane E, so that side plates 17 may be interchanged without influencing the construction. The vertical direction is indicated by arrow V. Due to the symmetrical design of the mounting bracket and the location of centre C, the origin of forces applied to the mounting bracket by the trailing arm will essentially be located near the centre C so that force moments applied to the mounting bracket is kept to a minimum. Because the mounting plate 19 lies flat against the vertical portion of a chassis beam or a beam of a slider assembly, no moments will be transferred into the chassis or slider assembly either. The chassis or slider assembly thereby may be designed less stiff and thus more lightweight.

Around the respective openings 17c, the side plates comprise inwardly projecting dents 17d, which in this embodiment have a tapering sidewall.

The attachment eye 14 has a central bore portion 102 and two opposing tapering bore portions 100, 101, wherein the central bore portion connects the inner ends of the opposing tapering bore portions. The tapering bore portions 100,101 match with the tapering sidewall of the dents 17d. In between the tapering sidewall of the side plates 17 and the tapering bore portions a corresponding resilient ring 104 is provided, each having a central bore portion for the hinge pin 10. In this embodiment, the resilient ring 104 comprises an elastomeric material 108, preferably rubber, sandwiched between two metal rings 106,109, wherein the metal rings 106, 109 are arranged to engage with one of the side plate 17 or attachment eye 14 of the trailing arm 7, i.e. the metal rings and elastomeric material are substantially parallel to the tapering sidewall of the dents 17d and the tapering bore portions of the attachment eye 14.

The hinge pin 10 comprises a bolt 10a cooperating with a nut 10b. The nut 10b comprises a tapering surface 10d that matches with the tapering side wall of a dent 17d. The head of the bolt has a tapering surface 10c that also matches with the tapering side wall of a dent 17d. The head and the nut are thus able to act as clamping members, as bolting the nut to the bolt will result in compression of the respective side plate 17 towards each other and the resilient ring 104 between the attachment eye 14 and the head of the bolt or the nut.

The mounting bracket according to the present invention has for an advantage that the compression of the side plates 17 by tensioning the hinging bolt 10, does not result in high stresses in the attachment of the bracket to the chassis or slider assembly as may be the case with conventional mounting brackets which are often welded to a horizontal portion of a chassis beam or slider beam.

Attached to the nut 10b is a mounting flange 40 to which a strut element 33 can be connected to provide a stiffness in the transverse direction perpendicular to the plane. This mounting flange 40 can alternatively be attached to the right side plate 17 instead of the hinge pin/nut.

Figure 4:
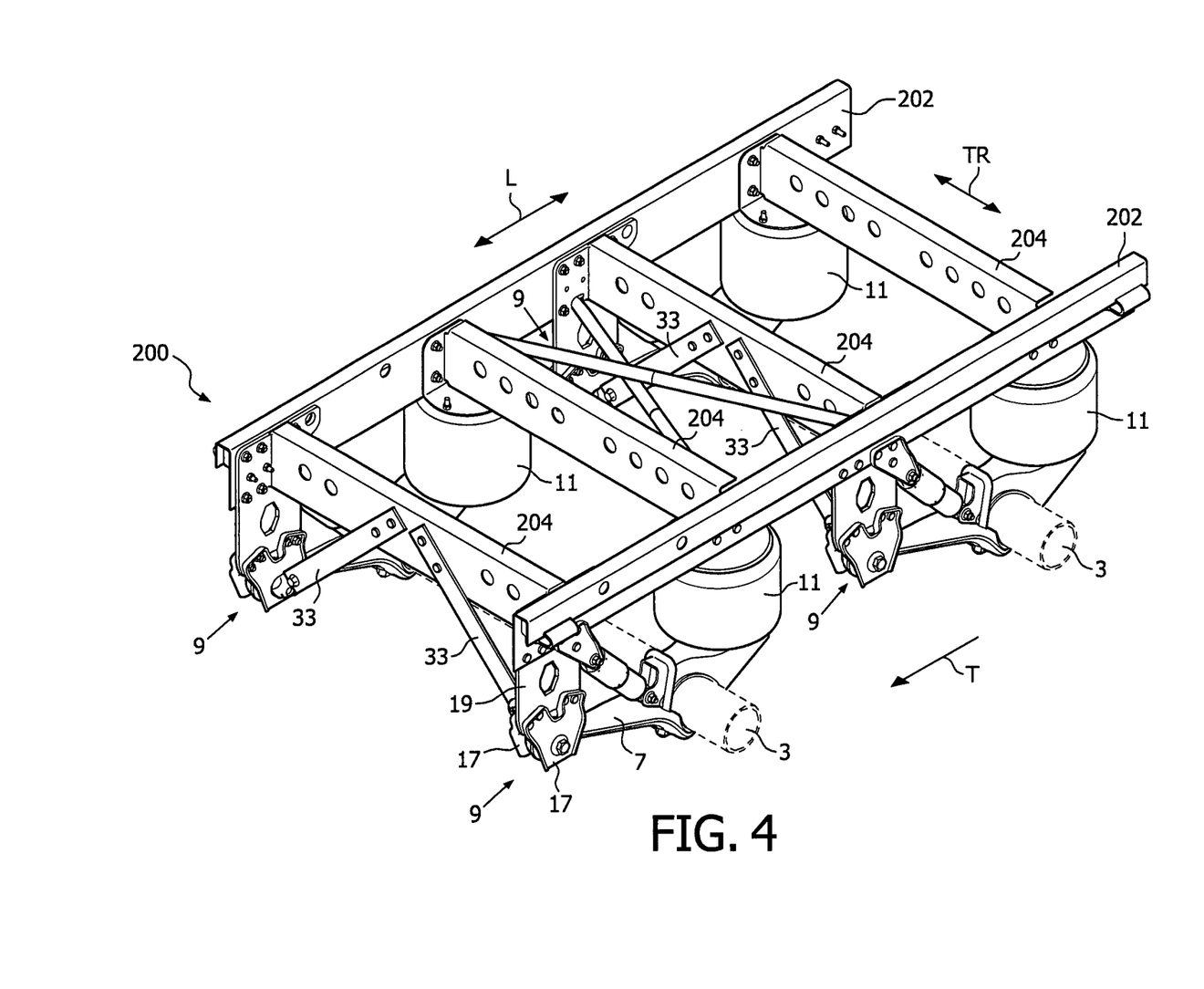
FIG. 4 depicts in perspective view a trailer slider assembly according to a further embodiment of the invention.

FIG. 4 depicts in perspective view a trailer slider assembly 200 according to a further embodiment of the invention. The slider assembly 200 comprises a slider frame having beams 202 extending in the longitudinal direction L of a vehicle and beams 204 extending in transverse direction TR of the vehicle and connecting the two beams 202. The slider frame is configured to slidingly engage with a chassis of the vehicle in the longitudinal direction of the vehicle. The slider assembly in this embodiment supports two axles 3 extending in the transverse direction TR of the vehicle. When the slider assembly is moved relative to the chassis, the wheel axles and thus the wheels are moved as well, so that the slider assembly provides an adjustment of the position of the wheel, possibly in order to adjust the wheel base of the vehicle, which may be advantageous from the point of view of load distribution.

For each wheel axle 3, a wheel axle suspension is provided between the wheel axle and the slider frame. Each wheel axle suspension comprises two mounting brackets 9 according to the invention positioned on opposite sides of the vehicle seen in transverse direction. For one mounting bracket 9 is indicated that it comprises side plates 17 to receive a front end, seen in travelling direction T of the vehicle, of a trailing arm 7 in between them and a mounting plate 19 to connect the side plates to the slider frame. A trailing arm 7 is provided on each side of the vehicle.

The axles 3 are clamped to the corresponding trailing arms 7 and the other end of the trailing arms is connected to a spring element 11 in the form of spring bellow which in turn is also mounted to the slider frame.

The mounting brackets are provided with stiffness in the transverse direction by strut elements 33 provided between the beams 204 and the side plates 17 of the respective mounting bracket 9.

It is also possible that the slider frame only supports one axle or more than two.

Figure 5:
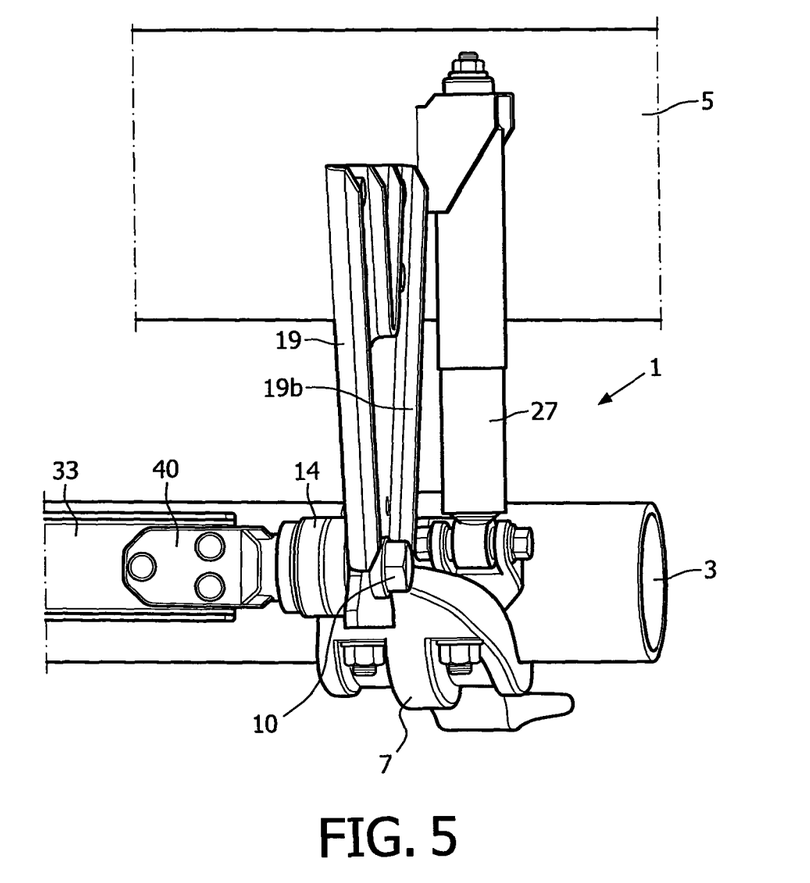
FIG. 5 depicts in perspective view a wheel axle suspension according to yet another embodiment of the invention.

FIG. 5 depicts a wheel axle suspension 1 according to yet another embodiment of the invention. The wheel axle suspension 1 is provided between a chassis 5 of a vehicle and an axle 3. The wheel axle is clamped onto a trailing arm 7 extending in a horizontal direction of the vehicle. With its front end 14, the trailing arm 7 is connected to a mounting bracket comprising a mounting plate 19 via a hinge pin 10. The mounting plate 19 is provided on the outside of the end 14 of the trailing arm 7. At the other end of the axle, a similar configuration is provided, in which the mounting plate 19 is also provided on the outside of the end 14 of the respective trailing arm. The two hinge pins on either side of the vehicle each are provided with a mounting flange 40 to which an end of a strut element 33 can be connected to interconnect the two hinge pins. As a result, no or almost no force moments will be applied to the mounting bracket by the trailing arms.

The mounting plate 19 in the shown embodiment of FIG. 5 has bended edges 19*b* to provide stiffness to the plate 19.

In FIG. 5 the mounting plate 19 is essentially flat except for the stiffening edges 19*b*. However the mounting plate may also be curved (not shown) such that the lower end is located more towards the outside (thus towards the wheel of the vehicle), such that the eyelet 14 of the longitudinal arm 7 is located essentially in line with the attachment of the plate 19 to the chassis beam 5. Thereby moments on the connection of the plate 19 on the chassis or slider beam resulting from loads on the arm 7 would be reduced.

The mounting flange 40 may also be arranged such that two strut elements can be connected to the mounting flange, wherein one strut element interconnects the hinge pins and the other strut element is provided between the hinge pin and the chassis for transverse stiffness.

It will be apparent to the person skilled in the art of wheel axle suspensions that the invention can be applied to both a chassis of a vehicle and to a slider assembly of a vehicle and that where in the application reference is made to chassis or slider assembly, also the other one can be read instead.

It is further apparent that different features as described with reference to the drawings and as described in the claims can be readily combined in any suitable manner.

The invention claimed is:

1. A trailing arm mounting bracket for mounting a trailing arm to a vehicle frame, wherein the bracket comprises two side plates each having a top end, a bottom end, and an opening in the bottom end for receiving a hinge pin, which side plates are positioned opposite each other with their opening at a mutual distance for receiving an end of the trailing arm in between their respective bottom ends, said mounting bracket furthermore comprising a mounting plate comprising a flat plate body having an upper portion and a lower portion which are spaced apart, wherein said side plates are mounted with their respective top ends to said lower portion of the, in a mounted condition, essentially vertically oriented mounting plate, said upper portion of the mounting plate being arranged to lie flat against a vertical portion of a beam of said vehicle frame so as to connect the mounting bracket to the vehicle frame, and wherein a centre of the shortest distance between the two openings in the side plates lies substantially in a plane defined by the body of the mounting plate.

2. The mounting bracket according to claim 1, wherein said lower portion of the mounting plate is located in between the top ends of the respective side plates.

3. The mounting bracket according to claim 1, wherein the side plates are symmetrically formed about said plane defined by the body of the mounting plate.

4. The mounting bracket according to claim 1, wherein the side plates are mounted to the mounting plate by means of side plate mounting bolts.

5. The mounting bracket according to claim 1, wherein the bottom ends of the side plates are substantially parallel, and wherein inwardly projecting dents are provided in the bottom ends in a region around the opening for the hinge pin.

6. The mounting bracket according to claim 5, wherein the dents have a tapering sidewall.

7. The mounting bracket according to claim 1, wherein the mounting plate comprises at least one weight-saving cutout.

8. A vehicle comprising a mounting bracket according to claim 1.

9. A wheel axle suspension suspend a wheel axle from a vehicle frame, comprising:

two trailing arm mounting brackets, each adapted to mount a trailing arm to said vehicle frame, wherein a mounting bracket is provided on each side of the vehicle, said mounting bracket comprising two side plates each having a top end, a bottom end, and a hinge receiving opening in the bottom end, which side plates are positioned opposite each other with their opening at a mutual distance for receiving an end of the trailing arm in between their respective bottom ends, said mounting bracket furthermore comprising a mounting plate comprising a flat plate body having an upper portion and a lower portion which are spaced apart, wherein said side plates are mounted with their respective top ends to said lower portion of the, in a mounted condition, essentially vertically oriented mounting plate, said upper portion of the mounting plate lying flat against a vertical portion of a beam of said vehicle frame to connect the mounting bracket to said vehicle frame, and wherein a centre of the shortest distance between the two openings in the side plates lies substantially in a plane defined by the body of the mounting plate;

longitudinal trailing arms on each side of the vehicle which extend in longitudinal direction of the vehicle and are each hingedly connected to a respective one of said mounting brackets by means of respective hinge pins; and spring bellows each of which is attached to an other end of the respective longitudinal trailing arms;

wherein the mounting brackets and the spring bellows are arranged to be connected to said vehicle frame.

10. The suspension according to claim 9, wherein the hinge pin extends through an attachment eye of the longitudinal trailing arm, and wherein the attachment eye comprises a central bore portion and two opposing tapering bore portions, wherein the central bore portion connects the opposing tapering bore portions, and wherein further two resilient rings and two clamping members are provided, each having a central bore for the hinge pin, wherein, in the mounted state, the resilient ring is received at least partially within a respective tapering bore portion, said resilient ring bearing with one side against the tapering surface of said tapering bore portion and said clamping member is forced against the other side of the resilient ring whereby the resilient ring is compressed between the clamping member and the tapering surface of the tapering bore portion.

11. The suspension according to claim 10, wherein the bottom ends of the side plates of the mounting bracket are substantially parallel, wherein inwardly projecting dents having a tapering sidewall are provided in the bottom ends of the side plates in a region around the opening for the hinge pin, and wherein the clamping members are provided on the outside of the dents, such that the resilient ring is compressed between the side plate and the tapering surface of the tapering bore portion.

12. The suspension according to claim 11, wherein the hinge pin is integrally formed with at least one clamping member.

13. The suspension according to claim 9, wherein the hinge pin is a hinge bolt cooperating with a nut, wherein the nut comprises a mounting flange for mounting one end of a strut element to the mounting bracket.

14. The suspension according to claim 9, wherein a shock absorber is provided between the wheel axle and the mounting plate.

15. The suspension according to claim 9, wherein the side plate of the mounting bracket located most inwardly of the two comprises a mounting flange for mounting one end of a strut element to the mounting bracket.

16. A vehicle comprising a wheel axle suspension according to claim 9.

17. A trailer slider assembly comprising:
a slider frame to slidingly engage with a chassis of a vehicle in a longitudinal direction of the vehicle;
a wheel axle extending in use in a transverse direction of the vehicle;
a wheel axle suspension which is mounted to the slider frame, said wheel axle suspension comprising:
   two trailing arm mounting brackets, each adapted to mount a trailing arm to the slider assembly of the vehicle, wherein a mounting bracket is provided on each side of the vehicle, said mounting bracket comprising two side plates each having a top end, a bottom end, and an opening in the bottom end adapted to receive a hinge pin, which side plates are positioned opposite each other with their opening at a mutual distance for receiving an end of the trailing arm in between their respective bottom ends, said mounting bracket furthermore comprising a mounting plate comprising a flat plate body having an upper portion and a lower portion which are spaced apart, wherein said side plates are mounted with their respective top ends to said lower portion of the, in a mounted condition, essentially vertically oriented mounting plate, said upper portion of the mounting plate lying flat against a vertical portion of a beam of said slider frame to connect the mounting bracket to the slider assembly, and wherein a centre of the shortest distance between the two openings in the side plates lies substantially in a plane defined by the body of the mounting plate;
   longitudinal trailing arms on each side of the vehicle which extend in longitudinal direction of the vehicle and are each hingedly connected to a respective one of said mounting brackets by means of respective hinge pins; and
   spring bellows each of which is attached to an other end of the respective longitudinal trailing arms,
   wherein the mounting brackets and the spring bellows are connected to the slider assembly which is mounted to the slider frame.

18. The trailer slider assembly according to claim 17, comprising a fixing mechanism to fix the slider frame relative to the chassis of the vehicle, said fixing mechanism comprising operation means to fix and release the fixing mechanism.

19. A vehicle comprising a trailer slider assembly according to claim 17.

* * * * *